2,989,561
DIMETHYL SULFONIUM ETHYL PHENYL CYCLOHEXENYL ACETATES
Torben Emil Neesby, Boonton, Robert Fuhrmann, Dover, and Anthony W. Pircio, East Brunswick, N.J., and Heino A. Luts, Oxford, Miss., assignors to Carroll Dunham Smith Pharmacal Company, a corporation of New Jersey
No Drawing. Filed Dec. 21, 1956, Ser. No. 629,784
3 Claims. (Cl. 260—457)

The present invention relates to novel chemical compounds that have specialized utility as anti-spasmodic drugs.

It is among the objects of the invention to provide a drug of the above character which may be administered either orally or parenterally, without objectionable effect on the organism and which is characterized by materially greater activity than previously known anti-spasmodic drugs, so that the desired anti-spasmodic effect may be attained by the administration of a lesser amount of the drug, and the activity of which is highly selective on the digestive and excretory tracts as distinguished from other anticholinergic drugs that also inherently act objectionably as mydriatics and xerostomics and moreover disturb the urinary function.

The compositions of the invention are sulfonium compounds of substituted acetic acid esters, in which the sulfonium group is contained in the alcoholic part of the compound and is separated from the ester linkage by 1 to 10, but preferably by 2 and desirably by 3 carbon atoms.

The substituted acetic acid radical is dimethyl sulfonium ethyl phenyl cyclohexenyl acetate, with an anion on the sulphur atom of bromine or iodine, preferably bromine, or lower alkyl sulphate, preferably methyl sulphate.

The alcoholic or esterifying group is an alkanol sulfide or thio-alcohol of the formula $OH(CH_2)_2—SR_4$, where $R_4$ is methyl, ethyl, isopropyl, propyl, or allyl. The esterification of the substituted acetic acid may be effected by either of two methods, as follows:

(a) The chloride of the substituted acetic acid is reacted with the alkanol sulfide $OH(CH_2)_2—SR_4$ in benzene solution.

The reaction is

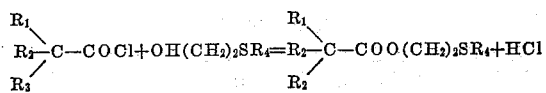

or alternatively, (b) The sodium salt of the substituted acetic acid is reacted with a halogeno alkyl sulfide $X(CH_2)_2—SR_4$ (where X is the halogen), preferably in anhydrous isopropyl alcohol. The reaction is

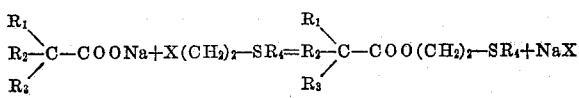

After esterification of the compound by either method (a) or method (b), the product is purified, preferably by vacuum distillation and is then tertiarized by reaction with an alkyl halide, dialkyl sulfate or alkyl aryl sulfonate as the tertiarizing agent. For the more stable compounds within the scope of the invention, especially where the tertiarizing compound reacts slowly, the reaction may be carried on at room temperature or even at elevated temperature. In the case of very low boiling tertiarizing agents, the tertiarizing process would be carried out at low temperature, $+10°$ C. to $-10°$ C. in a refrigerator for from two days to a week or two.

The substitution radical of the acetic acid may be alpha-phenyl with alpha (2,3-cyclohexenyl) or with alpha cyclohexylidene.

Among the preferred substituted acetic acid groups useful for the purpose are alpha-phenyl, alpha-(2,3-cyclohexenyl) acetic acid; alpha-phenyl, alpha-cyclohexylidene acetic acid; alpha-cyclohexyl, alpha-cyclohexylidene acetic acid; alpha cyclohexyl alpha cyclohexylidene acetic acid.

Among the preferred alcoholic or esterifying groups useful for the purpose of the invention are methyl beta-chloroethyl sulfide, methyl beta-ethanol sulfide, beta-chloroethyl isopropyl sulfide and gamma chloro-propyl sulfide.

Among the preferred tertiarizing agents are methyl bromide and dimethyl sulfate, although less desirably the corresponding ethyl, iso-propyl, allyl, benzyl or phenyl iodides may be used.

It is noted that the iodide affords a product of less stability and more difficult to purify than the corresponding bromide.

A number of specific examples of preferred compositions and processes for preparing the same, within the scope of the invention are now set forth, fully to comply with the statutory requirements.

EXAMPLE 1

Dimethyl sulfonium ethyl alpha-phenyl, alpha-(2,3-cyclohexenyl) acetate bromide 8.64 parts of alpha-phenyl, alpha-(2,3-cyclohexenyl) acetic acid (prepared according to known methods), is dissolved in isopropyl alcohol and then neutralized to phenolphthalein with isopropyl alcohol solution of sodium isopropylate.

4.8 parts of methyl, beta-chloroethyl sulfide is added and the mixture refluxed for four hours. The cooled solution is filtered from the sodium chloride formed, the solvent evaporated and the residue distilled. The fraction which boils at 179 to 183° C. at 3 to 4 mm. and has refractive index $n_D^{20}=1.547$ amounts to 9.2 parts of methyl thioethyl alpha-phenyl alpha (2,3-cyclohexenyl) acetate of the following structural formula:

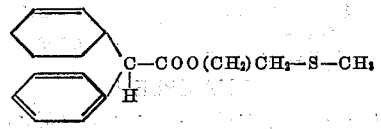

(79% yield)

The fraction thus recovered is dissolved in methyl alcohol cooled to 0° C. and tetrtiarized by adding an excess of methyl bromide and kept in a refrigerator at $+10°$ C. to $-10°$ C. for about 48 hours.

The solvent and excess methyl bromide are evaporated under reduced pressure.

The residue upon trituration with dry ether gives a 55% yield of crystalline

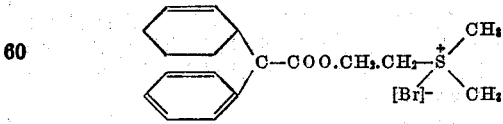

As an alternative method of esterification of the substituted acetic acid, 2.34 parts of alpha phenyl, alpha-(2,3-cyclohexenyl) acetic acid chloride is reacted with 0.93 parts of methyl beta-ethanol sulfide in benzene solution at reflux temperature. The benzene solution is washed with dilute sodium carbonate solution, then with water and dried over sodium sulfate. The solvent is evaporated and the residue is vacuum distilled, yielding 2.5 parts of methyl thioethyl alpha-phenyl, alpha (2,3-cyclohexenyl) acetate, which is then tertiarized in the manner to yield the product described above.

EXAMPLE 2

*Dimethyl sulfonium ethyl alpha-phenyl cyclohexylidene acetate bromide*

3.24 parts acid (prepared according to known methods) are dissolved in 100 parts dry isopropyl alcohol, then neutralized with sodium isopropylate solution. 2.5 parts of methyl beta-chlorethyl sulfide is added and the mixture refluxed for 13 hours. The cooled solution is filtered, the solvent evaporated, and the residue vacuum distilled. 4.4 parts (or 95% yield) of

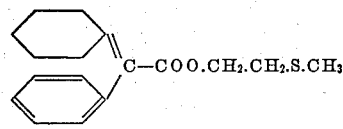

is collected at 190–197° C. and 2–3 mm.; $n_D^{18}=1.559$.

The compound is dissolved in methyl alcohol and after cooling to 0° C., an excess of methyl bromide is added. After a reaction time of 72 hours in the ice box, the methyl bromide and solvent are evaporated and the residue triturated with dry ether. 3.4 parts of crystalline

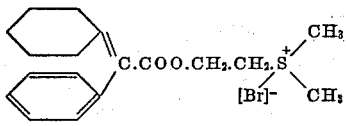

are collected. The compound can be further purified by crystallization from a mixture of ethyl alcohol and dry ether or by petroleum ether.

EXAMPLE 3

*Dimethyl sulfonium ethyl alpha phenyl alpha-(2,3-cyclohexenyl) acetate methyl sulfate*

Three parts of methyl thioethyl alpha-phenyl alpha-(2,3-cyclohexenyl) acetic acid are reacted at room temperature with 5 parts of dimethyl sulfate for 60 hours. The mixture is then shaken with dry ether, the ether decanted and the residual oil triturated with ethyl acetate giving 1.8 parts of sulfonium compound of the formula

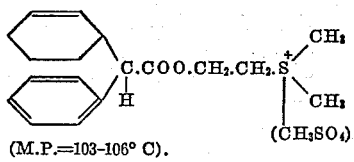

(M.P.=103–106° C).

EXAMPLE 4

*Methyl isopropyl sulfonium ethyl alpha-phenyl alpha-(2,3-cyclohexenyl) acetate bromide*

4.32 parts of alpha-phenyl alpha-(2,3-cyclohexenyl) acetic acid dissolved in isopropyl alcohol is neutralized with a sodium isopropylate solution. Then 3.1 parts (10% excess) of beta-chloroethyl isopropyl sulfide is added and the solution refluxed for 5 hours $(n_D^{20}=1.482)$ B.P.=53–55/19 mm.)

The sodium chloride formed is filtered off, the solvent evaporated and the residue is distilled giving 4.6 parts (71.5% yield) of isopropyl thioethyl alpha-phenyl alpha-cyclohexenyl acetate B.P.=169–174/1.2 mm. $n_D^{17}=1.538$ 4.5 parts of the above compound is dissolved in methyl alcohol, treated with an excess of methyl bromide and reacted for 50 hours at 0–10° C. The solvent and excess methyl bromide are evaporated and the residue triturated with petroleum ether giving 1.1 part of sulfonium compound of the formula:

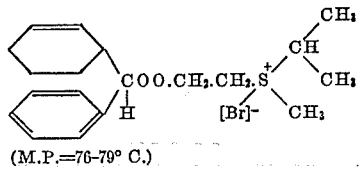

(M.P.=76–79° C.)

EXAMPLE 5

*Methyl isopropoyl sulfonium ethyl alpha-cyclohexyl alpha-cyclo-hexylidene acetate bromide*

6.66 parts of alpha-cyclohexyl, alpha-cyclohexylidene acetic acid is dissolved in isopropyl alcohol, neutralized with sodium isopropylate and 5.75 parts of beta-chloro ethyl isopropyl sulfide is added. The solution is refluxed for 18 hours, the sodium chloride filtered off, the solvent evaporated and the residue vacuum distilled, yielding 8.5 parts (89.5% isopropyl thioethyl, alpha-cyclohexyl alpha-cyclohexylidene acetate B.P.=183–185/0.3 mm. $n_D^{18}=1.508$ Three parts of this compound dissolved in methyl alcohol are reacted for 48 hours with an excess of methyl bromide at 0° to 10° C. The solvent is evaporated and the residue treated with petroleum ether, yielding one part sulfonium compound, of the formula:

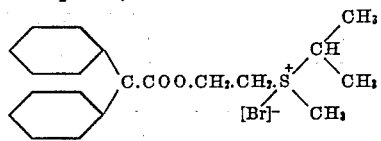

(M.P.=96–98.5° C.)

EXAMPLE 6

*Methyl isopropyl sulfonium ethyl alpha-cyclohexyl alpha-cyclohexylidene acetate methyl sulfate*

2 parts of isopropyl thioethyl alpha-cyclohexyl alpha-cyclohexylidene acetate are reacted for 50 hours at room temperature with 5 parts of dimethyl sulfate. The mixture is shaken with dry ether, the ether decanted and the residual oil brought to crystallization by triturating with a mixture of ethyl acetate and pertoleum ether.

There is yielded a compound of the formula:

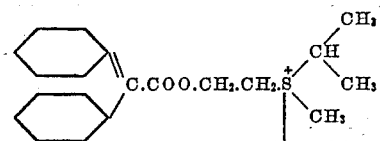

(M.P.=125–127° C).

It will be understood that the esterification of the substituted acetic acid of any of Examples 2 to 11 may be accomplished by the alternative method set forth in the final paragraph in Example 1.

The sulfonium compounds of the above typical examples are characterized by excellent and selective antispasmodic activity, especially in the digestive tracts. The drugs in question which may be administered orally or parenterally, if desired, are especially effective for the treatment of peptic ulcers, spasms, colitis, hyperacidity, hyper-mobility of the stomach and intestines and urinary lithiasis, with substantial avoidance of undesirable side effects, that is with a minimum general cholinergic effect, and more particularly with a minimum xerostomic effect and a minimum cycloplegic effect. The compositions of the present invention are as active for the selective effect in the digestive and excretive systems as the best anticholinergic drugs heretofore available and are distinguished from such drugs by the minimized disturbing side effect, including the mydriatic, xerostomic and cycloplegic effects. Comparative tests of the compounds of the foregoing Examples 1 to 7 with respect to known antispasmodic compounds with regard to xerostomic side effects are as follows:

| Names of Compounds: | Percent Inhibition of Salivation in Rabbit |
|---|---|
| Atropine | 94.9 |
| Novatropine (tropine-mandelate methobromide) | 76.7 |
| Diethylaminoethyl (alpha-cyclohexyl alpha-phenyl) glycolate methobromide | 88.1 |
| Scopolamine methobromide | 93.6 |
| Diethylaminoethyl (9-xanthene carboxylate) methobromide | 87.4 |
| Di-(isopropyl) aminoethyl (9-xanthene carboxylate) methobromide | 93.2 |
| 5 | 44.4 |
| 1 | 66.5 |
| 4 | 41.2 |
| 2 | 0 |
| 6 | 69.6 |
| 7 | 74.2 |
| 3 | 4.9 |

It will be noted that the composition of Example 2 is completely devoid of xerostomic effect, and while the other foregoing examples of the present invention are not as perfect in this respect, each evidences a material reduction in xerostomic effect as compared with known antispasmodics. The various compounds of the example set forth are also characterized by substantial reduction in mydriatic and cycloplegic effects as compared with known anti-spasmodics, all of which have powerful mydriatic, xerostomic and cycloplegic effects.

Sulfonium compounds of acetic acid substituted by diphenyl, by alkyl-aryl, by cycloalkyl aryl and by benzilate do not have the selective anti-spasmodic effect and the high efficacy of the compounds of the present invention.

As many changes could be made in the above process and compound and many apparently widely different embodiments of this invention could be made without departing from the scope of the claims, it is intended that all matter contained in the above description shall be interpreted as illustrative and not in a limiting sense.

Having thus described our invention, what we claim as new and desire to secure by Letters Patent of the United States is:

1. Dimethyl sulfonium ethyl alpha-phenyl, alpha-(2,3-cyclohexenyl) acetate with the anion on the sulphur atom selected from the group consisting of bromide, iodine and the lower alkyl sulphates.

2. The compound of the formula

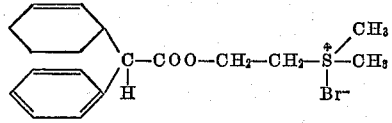

3. The compound of the formula

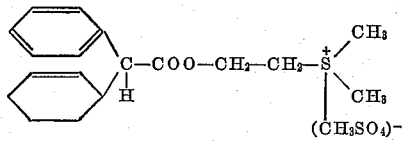

References Cited in the file of this patent

UNITED STATES PATENTS 2,671,120   Ipatieff et al. _____ Mar. 2, 1954

FOREIGN PATENTS 520,988   Belgium _____ July 15, 1953

OTHER REFERENCES

Chem. Abstracts, vol. 50, Col. 7140, May 1956. Abstract of Miroslav Protiva and Otto Exner, Czech Patent, 83,205, Feb. 3, 1955.